W. H. ROST.
TRANSMISSION MECHANISM.
APPLICATION FILED FEB. 8, 1915.
1,167,718.
Patented Jan. 11, 1916.
3 SHEETS—SHEET 1.
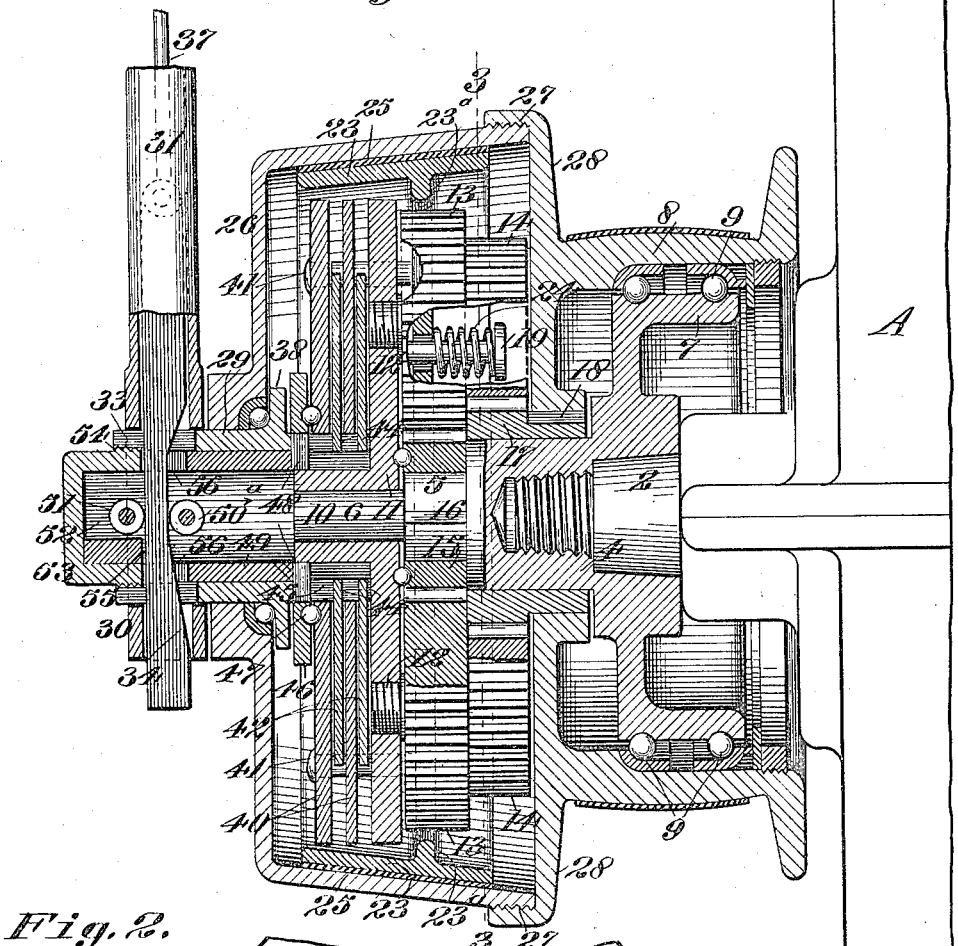
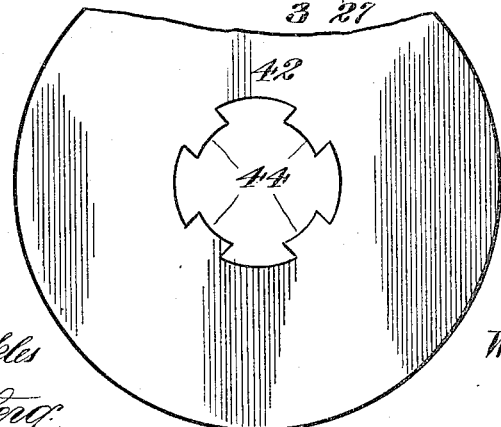
WITNESSES:
Charles Rokles
Thos Lashberg
INVENTOR
William H. Rost,
BY G. H. Strong.
ATTORNEY W. H. ROST.
TRANSMISSION MECHANISM.
APPLICATION FILED FEB. 8, 1915.
1,167,718.
Patented Jan. 11, 1916.
3 SHEETS—SHEET 2.
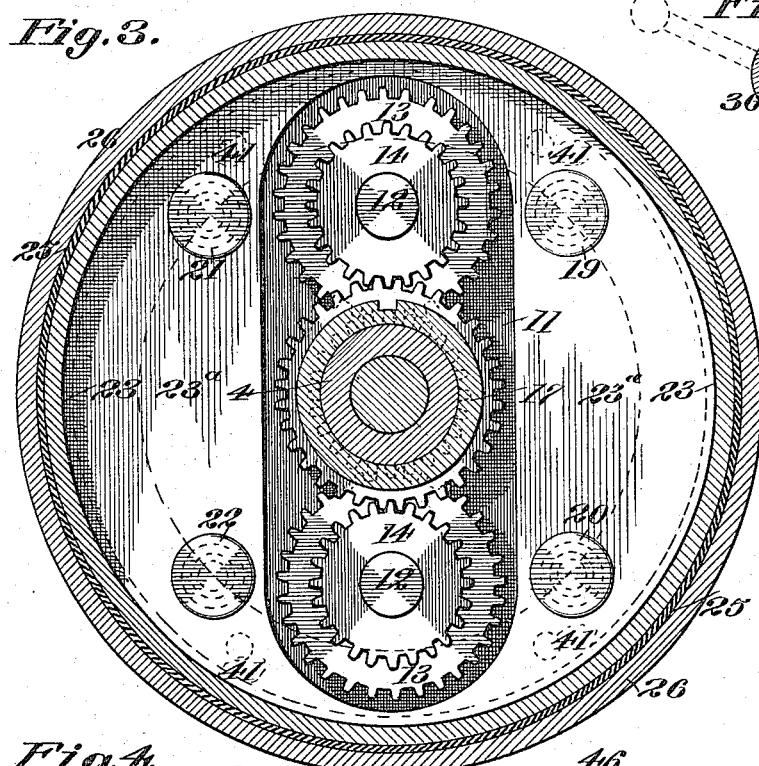
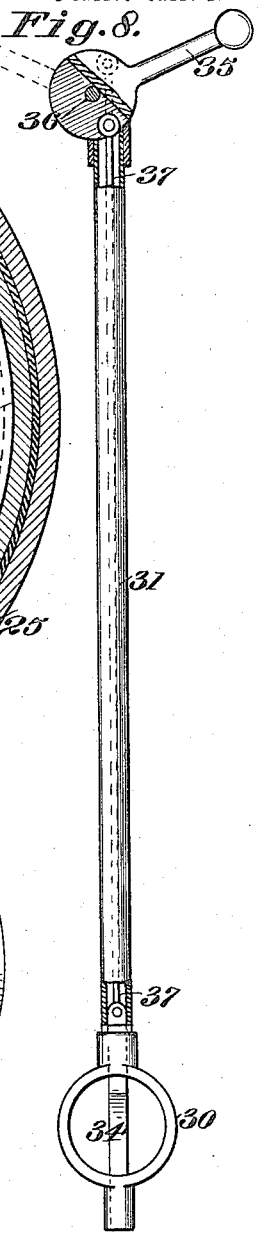
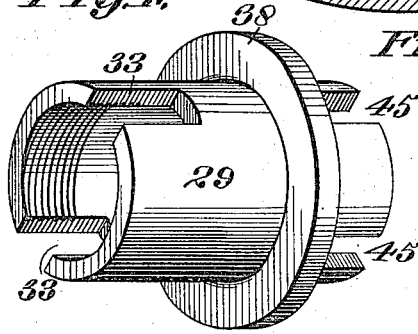
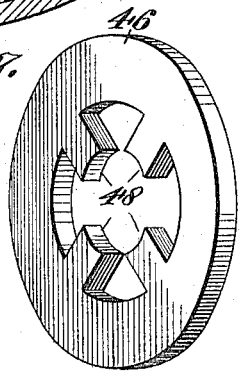
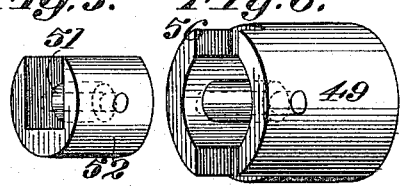
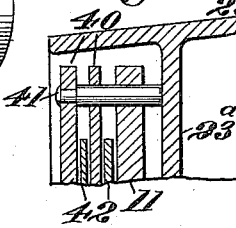
WITNESSES:
Charles Rekles
Thos Eastberg
INVENTOR
William H. Rost,
BY G. H. Shong,
ATTORNEY

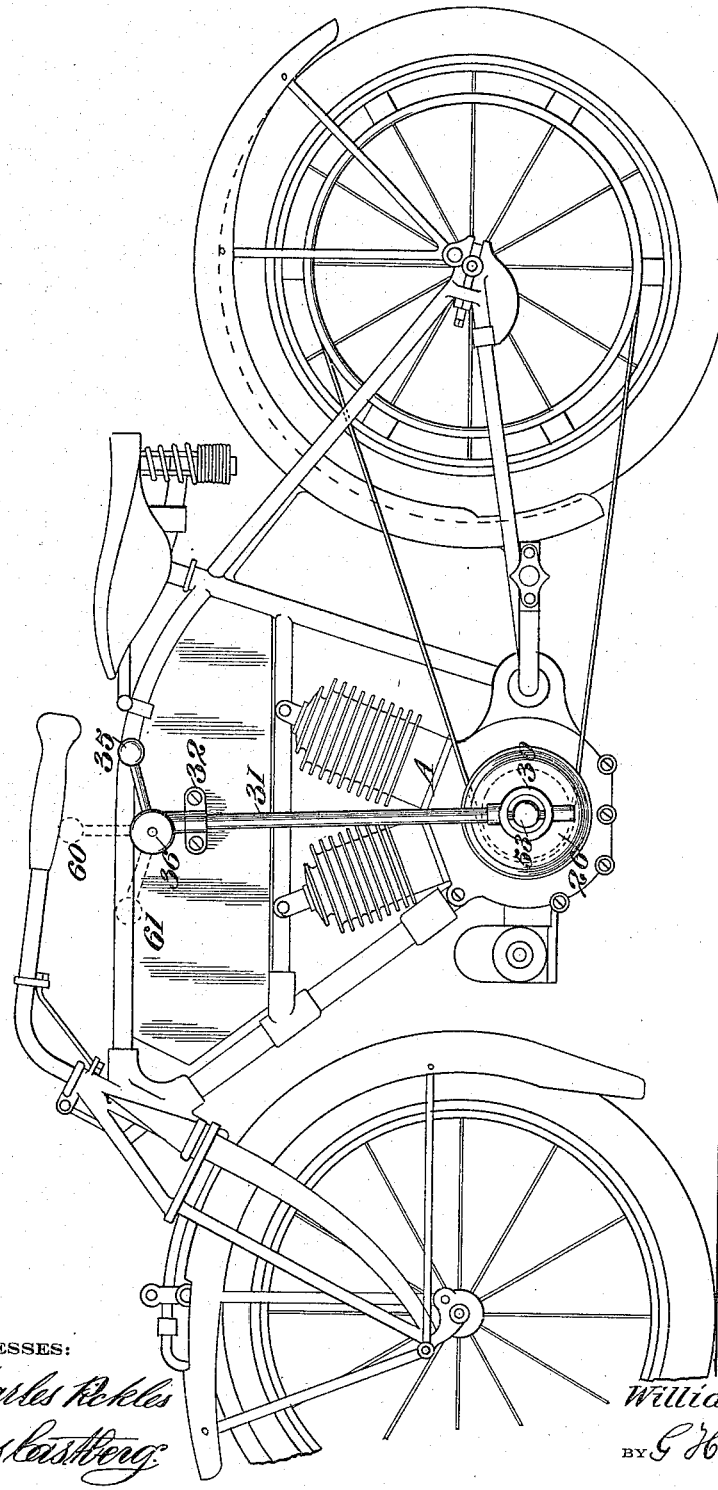

UNITED STATES PATENT OFFICE.

WILLIAM H. ROST, OF OAKLAND, CALIFORNIA, ASSIGNOR TO RUDOLPH-MYERS MANUFACTURING CO., OF SAN JOSE, CALIFORNIA, A CORPORATION OF CALIFORNIA.

TRANSMISSION MECHANISM.

1,167,718.

Specification of Letters Patent.

Patented Jan. 11, 1916.

Application filed February 8, 1915. Serial No. 6,796.

*To all whom it may concern:*

Be it known that I, WILLIAM H. ROST, a citizen of the United States, residing at Oakland, in the county of Alameda and State of California, have invented new and useful Improvements in Transmission Mechanism, of which the following is a specification.

This invention relates to a variable speed transmission mechanism for motorcycles and the like, and particularly to improvements on the patent of Edgar W. Myers entitled "Change speed mechanism for motorcycles", No. 1,113,814, issued October 13, 1914.

The object of the present invention is to provide a simple and more easily operated form of clutch controlling mechanism.

The invention consists of the parts and the construction and combination of parts as hereinafter more fully described and claimed, having reference to the accompanying drawings, in which—

Figure 1 is a central vertical section of the transmission, showing its application to the crank shaft of a gas engine. Fig. 2 is a detail view of one of the intermediate friction plates. Fig. 3 is a cross section on line 3—3, Fig. 1. Fig. 4 is a perspective view of the stationary sleeve 29. Figs. 5 and 6 respectively are perspective views of bearing member 50 and thrust sleeve 49. Fig. 7 is a perspective view of the thrust collar. Fig. 8 is a detail view, partly in section, of cam 34 with connected operating mechanism. Fig. 9 is a detail section showing the position of pin 41 with relation to the web of the cone clutch. Fig. 10 is a side elevation of the motorcycle showing the application of the invention.

More particularly described, A represents an engine having a crank shaft 2, to which is secured an extension drive-shaft. The driveshaft has formed on its outer end a series of offsets 4, 5 and 6 and on its inner end an enlarged annular shoulder extension 7, provided for the purpose of forming a bearing for the belt pulley 8; suitable ball-bearings, as 9, being interposed to reduce friction as much as possible.

Journaled upon the outer reduced extension 6 of the drive-shaft, as at 10, is a disk 11 provided with a pair of stud bolts 12, upon each of which is journaled a pair of connected, intermediate gears 13 and 14. The gears 13 are of larger diameter than the gears 14 and are so positioned as to intermesh with a driving pinion 15 suitably secured, as at 16, on the intermediate reduced section 5 of the extension drive-shaft, while the smaller intermediate gears 14 are adapted to intermesh with a secondary driving gear 17 secured, as at 18 to the belt pulley 8. The disk 11 is also provided with four headed stud bolts 19, 20, 21 and 22, upon which is slidably mounted a cone clutch 23. Interposed between the heads of the bolts and the main supporting web 23ª of the cone clutch member is a series of coil springs 24 provided for the purpose of normally throwing the cone into driving engagement with an opposed clutch face 25, formed on the inner surface of an inclosing housing or casing 26 secured, as at 27, to an internally threaded flange 28 formed on the belt pulley.

Centrally mounted in the housing 26 and having one end extending exterior thereof is a stationary sleeve 29. Mounted on the exterior end of said sleeve is a ring 30, and formed integral with said ring is a tubular member 31 which extends up to a point on the frame within convenient reach of the rider, the tube being clamped or otherwise secured to the frame, as at 32, to hold it stationary. Slidably mounted in the lower end of the tube, and extending through a pair of slots 33 cut in the outer end of sleeve 29, is a wedge-shaped cam member 34, the function of which will be later described. The cam is adapted to be reciprocated in a vertical direction and is operated by a lever 35 pivotally mounted, as at 36, in the upper end of the tube and a connecting rod 37.

Interposed between disk 11 and a collar 38 formed on sleeve 29 is a multiple disk clutch, generally indicated at 39. This clutch consists of a plurality of large plates 40 interlocked with relation to each other and disk 11 by means of pins 41 secured in the outermost plate and extending through disk 11 to a point where they contact with the web of the cone clutch. The pins 41 besides locking plates 40 and disk 11 together as a unit have another function which will be later described. Plates 40, together with disk 11 and cone clutch 23, are adapted to revolve as a unit; plates 40 revolving about the inner end of sleeve 29 while the disk 11, upon which the cone clutch is mounted, revolves about shaft 6, or they may be locked to remain stationary as a unit, as will later be described.

Interposed between plates 40 and disk 11 is a plurality of stationary intermediate disks 42. These disks are always stationary and are held in this position in the following manner: The center portion of each disk is cut out, as indicated at 43, to permit each disk to be slipped over the inner end of sleeve 29. Inwardly projecting lugs 44 are formed on each disk which project into slots 45 cut in the inner end of the stationary sleeve 29 and are in this manner locked with relation to the sleeve and will always remain stationary with same. Interposed between collar 38 on sleeve 29 and the outermost plate 40 is a thrust collar 46, and formed between said collar and plate is a ball race 47. Thrust collar 46 is also locked against revolution in a manner similar to the intermediate disks. The inwardly turned lugs 48, formed on the collar, project through slots 45 a sufficient distance to form a seat for a thrust sleeve 49 which is slidably mounted interior of the sleeve 29. Movement is transmitted to said sleeve by cam 34 which engages with a roller 50 carried by and journaled in the thrust sleeve. The other side of cam 34 engages with a thrust roller 51 which is journaled in a stationary bearing member 52; this bearing being mounted interior of a cap 53 which is screwed into the outer end of sleeve 29, as at 54. Bearing 52 is slotted at 55 and thrust sleeve 49 at 56 to permit cam 34 to pass through. The cam thus not only locks bearing 52 and thrust sleeve 49 against turning movement, but by passing through slots 33 in sleeve 29 also retains this, with connected thrust collar and intermediate disks, in stationary position.

The operation of the mechanism constructed and assembled as described will be as follows: When a direct engine drive is transmitted to pulley 8 cam 34 will stand in its lowermost position, such as indicated in Fig. 1. This permits the plates 40 in the multiple disk clutch to run free and will at the same time allow springs 24, interposed between the headed ends of the studs and web 23ª of the cone clutch, to exert their pressure on the web and cause the cone to be thrown forward into position where it will engage with the inner clutch face 25 formed in housing 26. The intermediate gears 13 and 14 are thus caused to interlock with driving pinion 5 and gear 17, which is secured on the pulley, causing plates 40, disk 11, cone clutch 23, housing 26 and connected pulley 8 to revolve as a unit with the crank shaft. A direct drive is thus transmitted.

When it is desired to free the engine, it is accomplished in the following manner: Lever 35 is turned from the horizontal position, indicated by full lines in Fig. 10, to the vertical dotted line position, indicated at 60. This movement of the lever is transmitted through rod 37 to pull the cam in an upward direction, causing it to force the thrust sleeve 49 inwardly in the direction of arrow $a$ a sufficient distance to engage the inwardly projecting lugs on the thrust collar 38. The thrust collar, together with the outer plate 40, is thus moved inwardly by the thrust sleeve a sufficient distance to bring pins 41, carried by plate 40, into engagement with web 23ª of the cone and force this out of engagement with the inner clutch face 25 formed in housing 26. Cone 23, plates 40 and disk 11 are now free to turn, and the revolving movement of driving pinion 5 will only cause the intermediate gears to run free about the secondary driving pinion 17. The engine is thus free and no power is transmitted.

When it is desired to transmit a two to one drive or half speed, it is accomplished by throwing lever 35 into the second dotted line position, indicated at 61. This lifts cam 35 still higher causing a corresponding inward movement of the thrust sleeve. The thrust collar is in this instance moved to such an extent that sufficient pressure is exerted to lock the several disks of the multiple disk clutch, thus locking disk 11, upon which the intermediate gears are journaled, from revolving movement causing same to stand in a stationary position. Disk 11, carrying the intermediate gears 13 and 14, being held stationary by the multiple disk clutch will now permit pinion 5 to transmit movement to gears 13; this movement being in turn transmitted, through the smaller intermediate gears 14, to the secondary driving pinion 17 which is secured to the driving pulley 8. The pulley, together with the connected housing 26, is thus caused to revolve at a reduced speed in proportion to the gear ratios of the driving pinion and connected gears about bearing 7 and sleeve 29. The engine may again be released by simply turning lever 35 back to the dotted line position 60, this position permitting the friction disks of the multiple disk clutch to disengage and a direct drive may be produced by completely returning the lever to the normal full line position which permits the friction disks to become entirely disengaged, while springs 24, surrounding the several stud bolts secured in disk 11, are permitted to exert their pressure upon web 23ª of the cone and force same into engagement with the frictional face of housing 26 to cause a direct drive.

Having thus described my invention, what I claim and desire to secure by Letters Patent is—

1. The combination with a driving and a driven element, and connecting gearing and a cone clutch, of a stationary sleeve mounted interior thereof, a multiple disk clutch mounted on said sleeve, a thrust sleeve slidably mounted interior of the stationary sleeve, a manually operated means for controlling the sliding movement of the thrust sleeve, means for transmitting the movement of the thrust sleeve to throw the cone clutch out, and means for transmitting the thrust of the thrust sleeve against the disks of the multiple disk clutch to lock same.

2. The combination with the cone clutch and multiple disk clutch in a transmission of the character described, of driving and driven elements and connecting gearing, a stationary sleeve 29, a thrust sleeve slidably mounted in said stationary sleeve, means for controlling the sliding movement of the thrust sleeve, and means for transmitting the sliding movement of the thrust sleeve to engage or disengage the multiple disk clutch and also to engage or disengage the cone clutch.

3. The combination with the cone clutch and multiple disk clutch in a transmission of the character described, of driving and driven elements and connecting gearing, a stationary sleeve 29, a thrust sleeve slidably mounted in said stationary sleeve, a roller journaled in the thrust sleeve, a cam member extending through the stationary sleeve and thrust sleeve and engageable with the roller, means for reciprocating the cam to transmit a similar movement to the thrust sleeve, and means for transmitting the movement of the thrust sleeve to disengage the cone clutch and also to lock the multiple disk clutch.

4. A variable speed transmission gearing for motorcycles, comprising a drive-shaft, a driving pinion secured to the shaft, a transmission pulley journaled on the shaft, a secondary driving pinion secured to the pulley, a disk 11 journaled on the shaft, a pair of stud bolts secured to said disk, a pair of intermediate gears on each stud bolt intermeshing with the driving pinion and the secondary pinion, a clutch member secured to the transmission pulley, a cone clutch member slidably mounted on studs projecting from disk 11 adapted to engage with the clutch member, springs surrounding the studs upon which the cone is slidably mounted adapted to normally force the cone into engagement with the clutch member, a stationary sleeve mounted in the clutch member, said sleeve having slots formed in its inner and outer end, a plurality of stationary disks having downwardly extending lugs engaging the inner slots in the sleeve, a plurality of revoluble disks mounted on the sleeve and interposed between the stationary disks, pins carried by the revolving disks engageable with the cone clutch, a thrust sleeve slidably mounted interior of the stationary sleeve, means for controlling the sliding movement of the thrust sleeve, and means for transmitting the movement of the thrust sleeve to move the cone clutch and multiple disks into and out of engagement independent of each other.

5. A variable speed transmission gearing for motorcycles, comprising a drive-shaft, a driving pinion secured to the shaft, a transmission pulley journaled on the shaft, a secondary driving pinion secured to the pulley, a disk 11 journaled on the shaft, a pair of stud bolts secured to said disk, a pair of intermediate gears on each stud bolt intermeshing with the driving pinion and the secondary pinion, a clutch member secured to the transmission pulley, a cone clutch member slidably mounted on studs projecting from disk 11 adapted to engage with the clutch member, springs surrounding the studs upon which the cone is slidably mounted adapted to normally force the cone into engagement with the clutch member, a stationary sleeve mounted in the clutch member, said sleeve having slots formed in its inner and outer end, a plurality of stationary disks having downwardly extending lugs engaging the inner slots in the sleeve, a plurality of revoluble disks mounted on the sleeves and interposed between the stationary disks, pins carried by the revolving disks engageable with the cone clutch, a thrust sleeve slidably mounted interior of the stationary sleeve, means for controlling the sliding movement of the thrust sleeve, said means including a cam engageable with the thrust sleeve and means for reciprocating the cam, and means for transmitting the movement of the thrust sleeve to move the cone clutch and multiple disks into and out of engagement independent of each other.

In testimony whereof I have hereunto set my hand in the presence of two subscribing witnesses.

WILLIAM H. ROST.

Witnesses:
R. SPRADO,
THOS. D. MCCRAITH.

Copies of this patent may be obtained for five cents each, by addressing the "Commissioner of Patents, Washington, D. C."